United States Patent [19]

Prats

[11] Patent Number: 4,937,593

[45] Date of Patent: Jun. 26, 1990

[54] PRINT HEAD POSITION CONTROL SYSTEM

[75] Inventor: Danny J. Prats, Los Gatos, Calif.

[73] Assignee: Apple Computer, Inc., Cupertino, Calif.

[21] Appl. No.: 380,234

[22] Filed: Jul. 14, 1989

[51] Int. Cl.$^5$ ........................ G01D 18/00; B41J 21/16; G05B 1/00

[52] U.S. Cl. ................................ 346/139 R; 400/279; 250/202

[58] Field of Search .................... 346/139 R; 400/279; 250/202, 548

[56] References Cited

U.S. PATENT DOCUMENTS 4,415,286 11/1983 Jennings .............................. 400/279

4,675,696 6/1987 Suzuki .................................. 346/46

OTHER PUBLICATIONS

Jingshown Wu and Ming-Her Chu, "Wobble Error Correction for Laser Scanners," *Applications of Digital Image Processing IX*, Andrew G. Tescher, Editor, Proc. SPIE, vol. 697, pp. 341-348 (1986).

*Primary Examiner*—Bruce A. Reynolds
*Assistant Examiner*—Gerald E. Preston
*Attorney, Agent, or Firm*—Mark Aaker

[57] ABSTRACT

A print head position control system for a printer in which a print head moves along a track and in which a light source illuminates along the track and a photodetector receives the light to produce a control signal in proportion to the position of the print head in relation to the light. A print head mount electromechanically adjusts the position of the print head in response to the control signal, so that the path of the light automatically controls the print head path along the track.

9 Claims, 1 Drawing Sheet

PRINT HEAD POSITION CONTROL SYSTEM

BACKGROUND

This invention relates to a printer in which a print head moves along a track, and a system to control the position of the print head. In particular, a light source and photodetector produce a control signal for driving a print head mount which adjusts the position of the print head.

In a printer in which a print head moves along a track across a page, the accuracy of the image printed on the page is dependent on how precisely the print head can be positioned. This is especially important in dot-matrix printers where an image is built from a mosaic of many dots, or in a color printer where individual colored dots are overlaid to blend their colors. It is known to use rigid materials to prevent undesired flex or sag of components, however this is expensive and cannot be rapidly adjusted as the printer is operating to compensate for acceleration, vibration, or other dynamic forces.

It is known to measure the horizontal, or X direction, movement of the print head along the track by mounting a detector on the head and moving it past a "picket fence" parallel to the track. By counting pulses from the detector, the position and speed of the head can be determined. Knowing the position and speed of the head, the precise time to activate the printing can be calculated. This allows precise positioning of print in the X direction along the track. However, no similarly accurate and affordable method of precise positioning of the print head was known for the other translational axes of movement: in the Y direction, up and down the page; or in the Z direction away from the surface of the page. It is also possible for a print head to twist or rotate around its X, Y, or Z axes, and no affordable method of measuring or controlling such twist was known.

What was desired, and is provided by this invention, is a control system in which the position of the print head can be both measured and adjusted in any of the x, y, or z translation or rotation directions. This allows very precise printing using a moving print head.

SUMMARY

This invention provides a print head position control system for a printer in which a print head moves along a track. A light source illuminates along the track and a photodetector receives the light to produce a control signal in proportion to the position of the print head in relation to the light. A print head mount electromechanically adjusts the position of the print head in response to the control signal, so that the path of the light automatically controls the print head path along the track.

DETAILED DESCRIPTION

Figure 1:
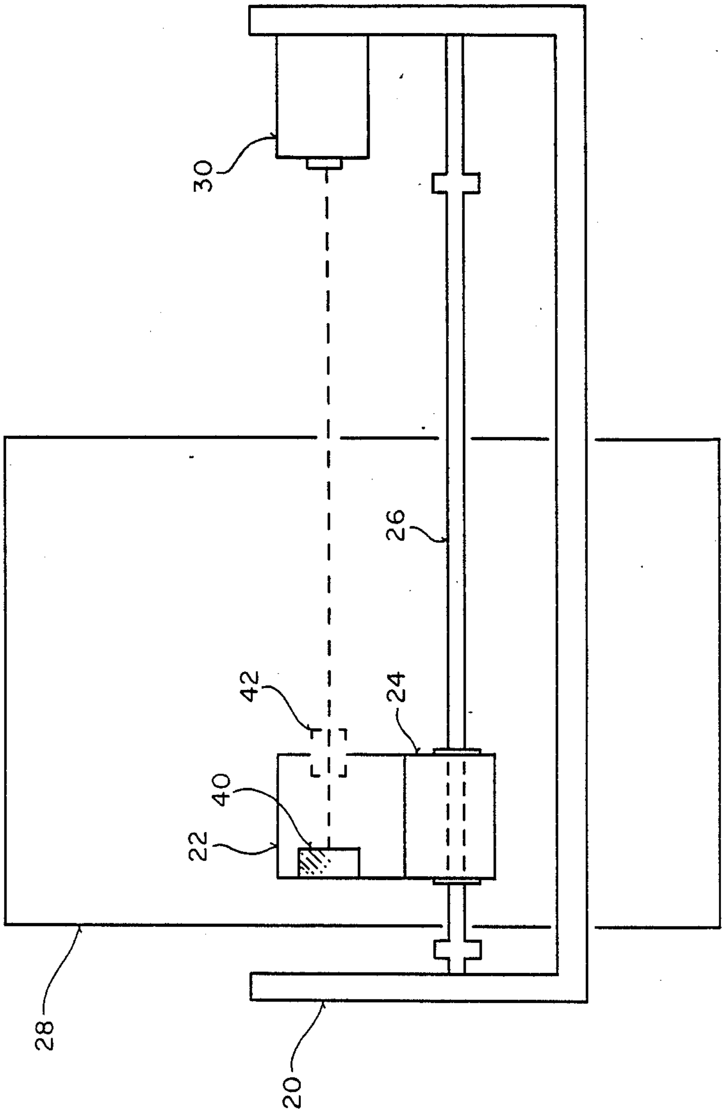
FIG. 1 shows a schematic cross section of a printer in accordance with the invention.

FIG. 1 shows a schematic cross section of a printer in accordance with the invention. The printer has a frame 20 for mounting and enclosing the printer components. A print head 22 mounted on a print head mount 24 moves along a track 26 traversing a page 28 moving through the printer by a page feed mechanism. The print head can be a dot-matrix, thermal, impact, or ink-jet printing element or elements. The print head mount 24 cooperates with scan mechanisms such as a wire or belt drive to travel along track 26, which can be a rigid metal or non-metallic rod, channel or beam. These elements cooperate in a conventional manner to scan the print head across a line of the page, advancing the page after each scan.

In this invention, a light source 30 is mounted to illuminate along the track 26. The light source can be mounted to the frame 20 or track 26. A distinct light source is preferred rather than relying on available ambient light, and the light source is preferably collimated, masked, or focused to produce a sharply defined narrow beam parallel to the desired print line along an ideal print path and the track 26. The light source 30 can be an incandescent or fluorescent light, a low intensity gas or ruby laser, or preferably a low cost semiconductor laser. The beam may be directly used, or may be reflected from a mirror to allow an orthogonal or offset mounting position. Of course, other light beam control devices such as lenses, fiber optics, and filters can be employed to define and orient the light beam.

A photodetector 40, is an optical sensor producing an electrical signal when illuminated. The photodetector 40 is mounted on the print head 22 to receive the illumination from light source 30. In this way, a deviation of the path of the print head 22 from the path of the beam from light source 30 causes a change in the electrical signal from photodetector 40. For example, a drop of intensity will be sensed if the head deviates from the illuminated path. The photodetector can include multiple elements in an array or pattern to further detect the direction of deviation, or to be responsive to changes in relative angle between the light path and detector. The necessary resolution, number of elements, sensitivity and size to accomplish the task will vary according to the light source brightness, path length, additional optical elements interspersed in the path and other factors in a particular embodiment.

A print head mount 24 carries print head 22 along track 26 and includes and provides electromechanical adjustment of the position of print head 22. For example, print head mount 24 can include a piezo-electric material or layers adjusted by an applied voltage to expand or contract, thereby moving the print head in a translation direction. If a piezo-electric element is mounted only to the corner or one end of print head 22, then piezo-electric expansion at that corner will rotate the print head through a small angle, allowing compensation for rotational errors. In this way, that the position of the print head is dependent on the voltage applied to the piezo-electric elements. As many elements can be used as needed to correct for various directions or deviation errors in the system. Piezo-electric elements can be both inexpensive and fast responding. Of course other electromechanical methods can be used in the print head mount such as linear actuators, solenoids, springs, electromagnets, motors, voice coils, stepping motors and other known electromechanical positioning mechanisms.

The electrical signal from photodetector 40 can be applied to a control circuit to generate a specific correction voltage or driving voltage for applying to the electromechanical positioning mechanisms of print head mount 24. The control circuit can contain analog or digital logic to develop proper response voltages in order to bring the print head 22 back into alignment with the light beam from light source 30.

In this way, the print head position control system will detect and correct errors in the movement of the print head as it traverses the track 26 and page 28.

In a preferred alternative embodiment, the position of the photodetector 40 on print head 22, is such that rotation of the print head can also be detected and corrected. For example, as shown in FIG. 1, the photodetector 40 can be placed on one edge of the print head 22 furthest from the light source 30. A small mask, tube, or hole 42 can be placed on the edge of print head 22 closer to the light source, requiring the light beam to pass through the hole to reach photodetector 40. In this way, rotation of the print head will cause the position of the hole 42 to change, blocking the path of light to photodetector 40. By passing the light beam through such a specifically shaped orifice, deviations in several directions can be detected. Alternatively, a second or split light beam and a more complex photodetector array would allow detection of angular or rotational error about several axes.

In other embodiments, the mounting positions of the light source 30 and photodetector 40 can be interchanged. For example, the light source 30 could be mounted on the print head 22, and the photodetector 40 be mounted to the frame 20. It would also be possible to co-locate the light source 30 and photodetector 40, say on the frame 20, and use a reflector element on the print head 22 to return the light beam to the photodetector 40.

In another embodiment, a laser light source can be used to determine the print head location along the print line by reflecting the beam back to the source and observing the interference pattern produced. This form of laser interferometry is a known technology of measuring distance and can be implemented along with the photodetector array embodiments described above. By using the laser to create an interferometer, the "picket fence" detector presently used for positioning in the direction of scan can be eliminated making the system even more precise and cost effective.

These and other embodiments can be practiced without departing from the true scope and spirit of the invention, which is defined by the following claims.

What is claimed is:

1. A print head position control system for a printer in which a print head moves along a track, comprising:

a light source illuminating along said track;

a photodetector receiving said light to produce a control signal in proportion to the position of said print head in relation to said light;

a print head mount for electromechanically adjusting the position of said print head in response to said control signal;

whereby, the path of said light automatically controls the print head path along said track.

2. A print head position control system for a printer in which a print head moves along a track, comprising:

a collimated light source aimed along said track;

a photodetector mounted on said print head to receive said collimated light and to produce a control signal in proportion to the amount of light received;

a print head mount for electromechanically adjusting the position of said print head in relation to said track; and a control circuit coupled for driving said print head mount in response to said photodetector control signal;

whereby, the reception of said collimated light automatically controls the print head position along said track.

3. A print head position control system as in claim 2 wherein said photodetector comprises an array of detecting elements.

4. A print head position control system as in claim 2 wherein said print head mount comprises a piezo-electric material.

5. A print head position control system as in claim 2 further comprising a mask between said light source and said photodetector.

6. A print head position control system as in claim 2 further comprising a second collimated light source aimed along a second path along said track.

7. A print head position control system as in claim 2 further comprising a laser interferometer for measuring distance from said interferometer to said print head.

8. A print head position control system for a printer in which a print head moves along a track within a frame, comprising:

a collimated light source mounted on said print head and aimed along said track;

a photodetector mounted on said frame to receive said collimated light and to produce a control signal in proportion to the amount of light received;

a print head mount for electromechanically adjusting the position of said print head in relation to said track; and a control circuit coupled for driving said print head mount in response to said photodetector control signal;

whereby, the reception of said collimated light automatically controls the print head position along said track.

9. A print head position control system for a printer in which a print head moves along a track within a frame, comprising:

a collimated light source aimed along said track;

a reflector mounted on said print head to reflect said collimated light;

a photodetector mounted on said frame to receive said reflected collimated light and to produce a control signal in proportion to the amount of light received;

a print head mount for electromechanically adjusting the position of said print head in relation to said track; and a control circuit coupled for driving said print head mount in response to said photodetector control signal;

whereby, the reception of said collimated light automatically controls the print head position along said track.

* * * * *